Patented Sept. 13, 1938

2,129,991

UNITED STATES PATENT OFFICE 2,129,991

1-ACIDYLAMINO-2-METHYL-4-AMINOANTHRAQUINONES

Joseph Deinet, Milwaukee, Wis., assignor to E. I. du Pont de Nemours & Company, Wilmington, Del., a corporation of Delaware No Drawing. Application January 25, 1937, Serial No. 122,219

4 Claims. (Cl. 260—377)

This invention relates to the preparation of new compounds of the anthraquinone series which are especially valuable for the preparation of dyestuffs. The invention relates more particularly to the preparation of monoacidylamino-2-methyl-4-aminoanthraquinones as new compounds and to a process for preparing them from the corresponding 1,4-diacidylamino-2-methylanthraquinones.

The preparation of monoacidyldiaminoanthraquinone compounds by direct acidylation of diamines is known to give very impure products, even where the monoacidylation is carefully controlled. Various attempts have been made to prepare the monoacidyldiaminoanthraquinone compounds from the corresponding aminochloroanthraquinones. This procedure, however, involves the several steps of acidylating with two different acid compounds and a subsequent selective hydrolysis.

It is therefore an object of this invention to prepare new compounds of the anthraquinone series which are valuable dyestuff intermediates. It is a further object of the invention to provide a simple and economical process for preparing 1-benzoylamino-2-methyl-4-aminoanthraquinones of high purity and in excellent yields.

I have found that the 1-benzoylamino-2-methyl-4-aminoanthraquinones can be prepared in high yields and in very pure form from 1,4-diamino-2-methylanthraquinone by substituting in both amino groups the benzoyl radical and then subjecting the dibenzoyldiamino-2-methylanthraquinone to hydrolysis with caustic. I have found that the 4-benzoyl radical hydrolyzes off completely before any hydrolysis of the 1-benzoylamino radical takes place, giving as a result a very pure 1-benzoylamino-2-methyl-4-aminoanthraquinone.

The hydrolysis of the 1,4-dibenzoylamino-2-methyl-anthraquinone is preferably carried out in alcohol with caustic, either caustic soda or caustic potash, at temperatures of from 50° C. to the boiling point of the alcoholic solution, or about 80° C. The amount of alcohol may be varied within wide limits for the reaction takes place readily when the product to be hydrolyzed is suspended in either a large or a small quantity of alcohol. Where a large quantity of alcohol is used the original compound goes into solution, and as the reaction proceeds the hydrolysis product comes out of the solution even while hot. To obtain a good stirrable mass during the precipitation of the monobenzoyl compound, at least 6 parts of alcohol should be used for 1 part of the dibenzoyl compound. Where a high dilution of alcohol is employed cooling may be required to start the precipitation of the 1-benzoylamino-2-methyl-4-aminoanthraquinone.

Although the selective hydrolysis may be carried out in water or an aqueous alcoholic medium of high water content, the reaction is preferably carried out in alcohol of 80% concentration and above. Where water or aqueous alcohol of high water content is used, the dibenzoylamino-2-methylanthraquinone should be in amorphous form, since the reaction does not proceed as rapidly as when alcohol of 80 to 93% is used.

A caustic alkali concentration of from 5 to 10%, based on the amount of alcohol and water used, has been found to give satisfactory results. While higher concentrations of alkali may be employed, they are not necessary.

The following examples are given to more fully illustrate the invention. The parts used are by weight.

Example 1

In 1800 parts of alcohol (93%) suspend 300 parts of 1,4-dibenzoylamino-2-methylanthraquinone (fine powder). Add 300 parts of caustic soda (40% by weight), heat to the boil (or approximately 78° C.) and hold at that temperature for 1 to 1½ hours. Cool to 25° C., filter, wash free of alkali and dry. The product obtained is 1-benzoylamino-2-methyl-4-aminoanthraquinone of high purity.

Example 2

In 360 parts of alcohol (93%) suspend 60 parts of 1,4-di(o-chlorobenzoylamino)-2-methylanthraquinone (fine powder), add 60 parts of caustic soda 40% by weight, heat to the boil and boil the mass for 1 to 1½ hours. Cool to 25° C., filter, wash free of alkali and dry. The product obtained is 1-o-chlorobenzoylamino-2-methyl-4-aminoanthraquinone.

Example 3

In 480 parts of alcohol (93%) suspend 80 parts of 1,4-di(p-methoxybenzoylamino)-2-methylanthraquinone (fine powder), add 80 parts of caustic soda 40% by weight, heat to the boil (78° C.) and hold for 1½ hours. Cool to 25° C., filter, wash free of alkali and dry. The product obtained is 1-p-methoxy-benzoylamino-2-methyl-4-aminoanthraquinone.

Example 4

In 300 parts of alcohol (93%) suspend 50 parts of 1,4-di(p-nitrobenzoylamino)-2-methylanthraquinone, add 50 parts of caustic soda 40% by weight, heat to the boil (78° C.) and hold for 1 hour. Cool to 25° C., filter, wash free of alkali and dry. The product obtained is 1-p-nitrobenzoylamino-2-methyl-4-aminoanthraquinone.

The 1,4-dibenzoylamino - 2 - methylanthraquinones used as the starting materials in this process may be prepared by reacting 1,4-diamino-2-methylanthraquinone with the desired benzoylating agent. The following example is given to illustrate a process for preparing these starting materials.

200 parts 1,4-diamino-2-methylanthraquinone are suspended with 250 parts of benzoyl chloride in 1200 parts of solvent naphtha. The mixturs is heated slowly to 135–137° C. and held for 1 hour. After cooling to room temperature it is filtered, and the precipitated 1,4-dibenzoylamino-2-methylanthraquinone is washed with alcohol and dried.

It is understood that where the term "benzoylaminoanthraquinones" or "a benzoylaminoanthraquinone compound" is used in the specification and claims, I intend to include those benzoylaminoanthraquinone compounds which contain simple substituents in the benzene nucleus, as above illustrated, which are generally considered to be benzoyl compounds.

It has been found that after removal of the monobenzoylamino-2-methyl-4-aminoanthraquinone compound from the reaction mass, the filtrate may be acidified and the benzoic acid liberated in the hydrolysis precipitated in substantial theoretical quantities and of high purity.

I claim:

1. As new compounds, 1-acidylamino-2-methyl-4-aminoanthraquinones wherein the acidyl group is of the benzene series.

2. As a new compound, 1-benzoylamino-2-methyl-4-aminoanthraquinone.

3. The process for preparing 1-benzoylamino-2-methyl-4-aminoanthraquinones which comprises dibenzoylating 1,4-diamino-2-methylanthraquinone and subjecting the dibenzoyl compound to an alkaline hydrolysis to selectively remove the benzoyl group in the 4 position.

4. In the process for preparing 1-benzoylamino-2-methyl-4-aminoanthraquinones, the step which comprises subjecting the 1,4-dibenzoylamino-2-methylanthraquinone to alkaline hydrolysis in an alcoholic suspension, at a temperature of from 50° C. to the boiling point of the alcoholic solution.

JOSEPH DEINET.